US005433008A

United States Patent [19]

Barger, Jr. et al.

[11] Patent Number: 5,433,008

[45] Date of Patent: Jul. 18, 1995

[54] CIRCULAR SAW WITH VARIABLE ADJUSTMENT STOPS

[75] Inventors: David L. Barger, Jr., Atoka; John W. Schnell, Jackson, both of Tenn.

[73] Assignee: Porter-Cable Corporation, Jackson, Tenn.

[21] Appl. No.: 189,500

[22] Filed: Jan. 31, 1994

[51] Int. Cl.$^6$ .................. B23D 45/14

[52] U.S. Cl. .................. 30/376; 30/293; 30/388

[58] Field of Search .................. 30/376, 388, 293, 321; 83/473, 471.3, 529

[56] References Cited

U.S. PATENT DOCUMENTS

| | | | |
|---|---|---|---|
| 2,208,582 | 7/1940 | Hollister | 83/471.3 |
| 2,955,629 | 10/1960 | Bork | 30/376 |
| 3,292,673 | 12/1966 | Gregory | 30/376 |
| 4,856,394 | 8/1989 | Clowers | 30/376 |
| 5,033,343 | 7/1991 | Gerber | 83/74 |
| 5,121,545 | 6/1992 | Nonaka et al. | 30/376 |

*Primary Examiner*—Kenneth E. Peterson
*Attorney, Agent, or Firm*—Merchant, Gould, Smith, Edell, Welter & Schmidt

[57] ABSTRACT

A circular power saw includes a housing enclosing a motor and a circular saw blade rotatably driven by the motor. The housing is pivotally mounted to a base so that the saw blade may be positioned in a plurality of cutting planes. An adjustment member is mounted to the base and connected to the housing to releasably retain the housing in a plurality of positions corresponding to the different cutting planes. The adjustment member has first and second stops that correspond to first and second planar positions of the cutting blade and a stop engagement member is adapted to engage the first and second stops. The stop engagement member has a first configuration wherein the first and second positions planar positions define the limits of the planar positioning of the blade. The stop engagement member has a second configuration where at least one planar position different than the first and second planar positions defines a limit of planar positioning of the blade. In the preferred embodiment with the engagement member in its second configuration third and fourth planar positions define the limits of planar positioning of the blade. The engagement member is selectively adjustable between its first and second configurations. The adjustment member and stop engagement member provide a device to back cut a workpiece.

6 Claims, 6 Drawing Sheets

CIRCULAR SAW WITH VARIABLE ADJUSTMENT STOPS

BACKGROUND OF THE INVENTION

The present invention relates broadly to circular power saws and more particularly to a mechanism for adjusting the cutting plane of the saw blade. Prior art circular power saws of the type of the present invention typically include a motor and housing pivotally mounted to a base plate. The motor drives a circular saw blade that extends through an opening in the base plate. In operation the base plate rests on the workpiece and is used as a guide during the cutting operation. The housing is pivoted to the base plate to permit the cutting plane of the saw blade to be adjusted. A common operational configuration is with the saw blade lying in a plane that is 90# or perpendicular to the plane of the base plate and workpiece. It may be desirable, however, to make a bevel cut in the workpiece. To accomplish bevel cutting, the housing is pivoted with respect to the base so that the cutting plane of the blade is angularly displaced from the 90# or perpendicular configuration. The prior art adjustment mechanisms typically allow the cutting plane to be varied from 0# (the 90# or perpendicular alignment) to 45# generating a 45# bevel cut.

SUMMARY OF THE INVENTION

The present invention is a circular power saw with an adjustment mechanism which allows for bevel cuts slightly beyond the typical 90# and 45# positions of the cutting blade. Such cuts are referred to as back cuts which are particularly advantageous in certain applications. In the present invention the power saw housing, motor and circular saw blade are pivotally mounted to a base allowing for positioning of the saw blade in a plurality of cutting planes. An adjustment means is mounted to the base and connected to the housing to releasably retain the housing in any one of the plurality of saw blade positions. The adjustment means includes an adjustment member with first and second stops corresponding to first and second planar positions of the blade. A stop engagement member is adapted to engage the first and second stops. The stop engagement member has a first configuration whereby the first and second saw blade positions define the limits of the planar positioning of the blade and a second configuration whereby at least a third planar position defines a limit of the planar positioning of the blade. The engagement member is selectively adjustable between its first and second configurations.

In the preferred embodiment, the adjustment means includes a base member with an elongated arcuate opening. First and second stops are positioned at opposite ends of the opening. A first stop engagement member is attached to the housing of the saw and is received within the elongated arcuate opening of the base member. A second stop engagement member is selectively mounted on the first engagement member in a first position and a second position. In the first position, the first engagement member engages the first and second stops to define the limits of the planar position of the blade and in its second position, the second engagement member engages the first and second stops to define the limits of the planar positioning of the blade.

Preferably, the adjustment means allows the planar position of the blade to be up to 3# beyond either the 45# or 90# cutting plane positions.

Thus, in the present invention the circular saw can be quickly and easily adjusted from the normal and typical 90# and 45# cutting plane limits to provide back cuts. These and other advantages of the present invention will become apparent with reference to the accompanying drawings, detailed description of the preferred embodiment and the claims.

DETAILED DESCRIPTION OF THE PREFERRED EMBODIMENT

Figure 1:
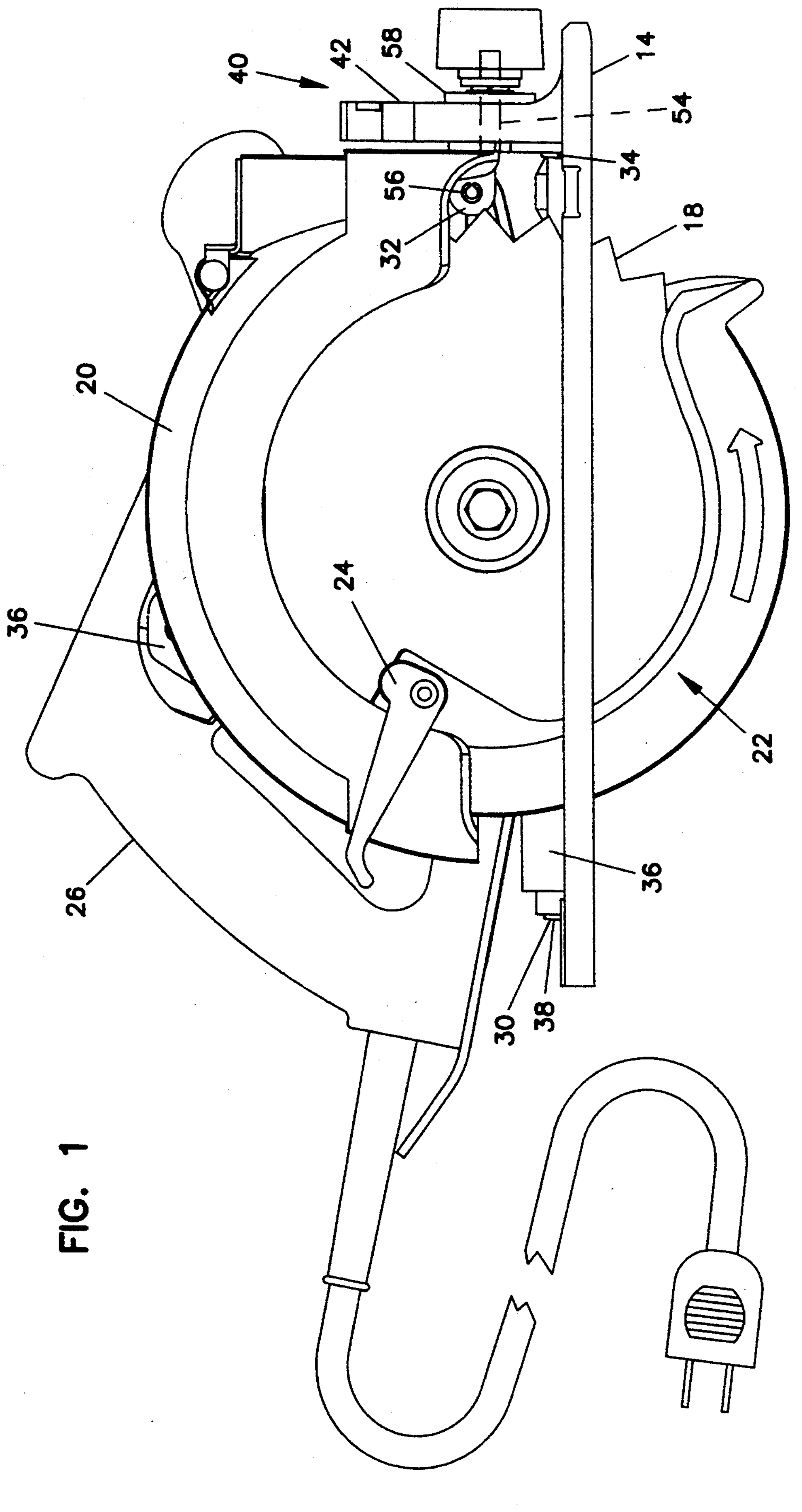
FIG. 1 is a side elevational view of the circular power saw of the present invention.
Figure 2:
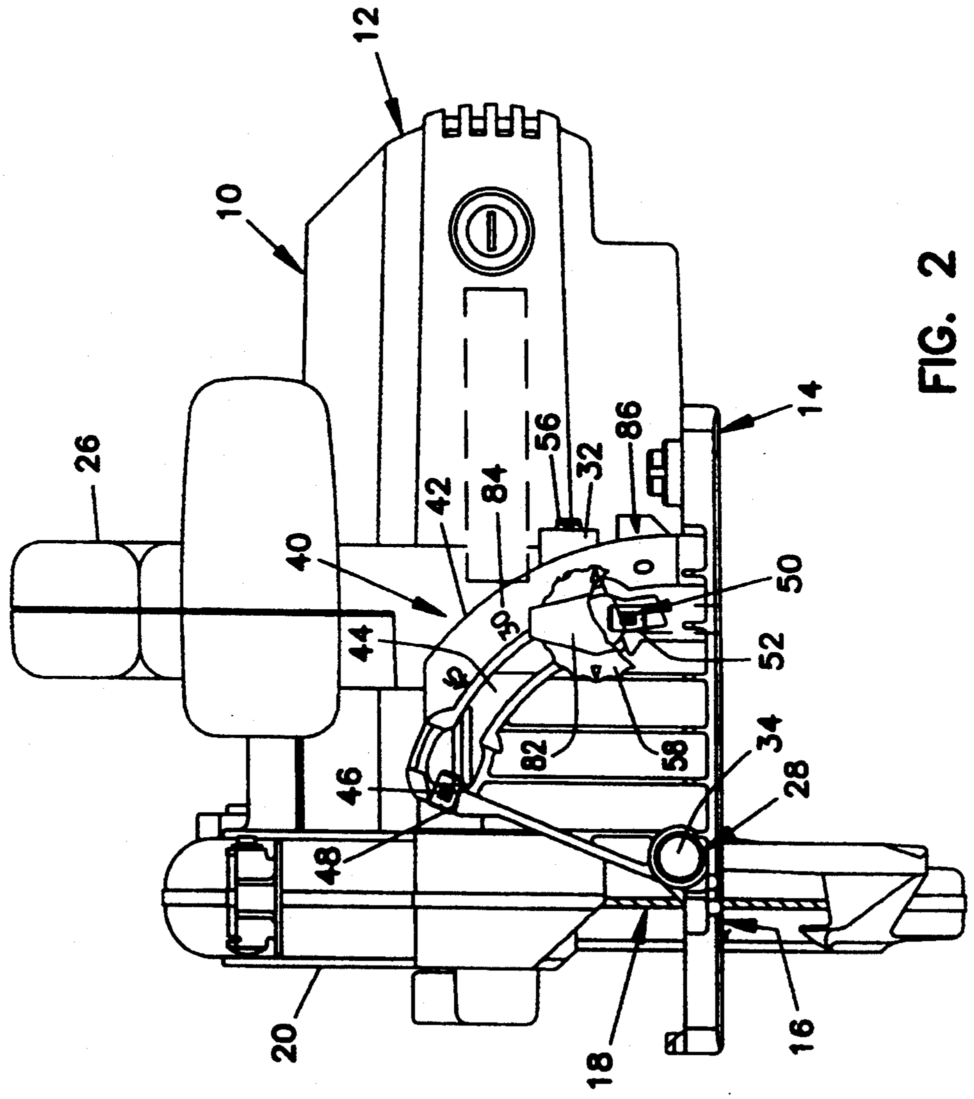
FIG. 2 is a front elevational view of the circular power saw shown in FIG. 1.

Referring to the drawings, wherein like numerals represent like parts throughout the several views, a circular power saw 10 includes a motor housing 12 and a base 14. Base 14 is a generally planar member having an opening at 16 through which a circular saw blade 18 extends. Saw blade 18 is rotatably driven by a motor (not shown) within housing 12. An upper blade guard and gear housing 20 is attached to housing 12. A lower blade guard 22 is rotatably mounted to upper blade guard 20 and has a manually actuated lever 24. A handle 26 is also attached to housing 12. Motor housing 12 and upper blade guard and gear housing 20 are pivotally mounted to base 14 at pivot points 28 and 30, respectively. Motor housing 12 is attached to a bracket 32 which is mounted on a pivot pin 34 which is rotatably mounted to base 14. Upper blade guard 20 is attached to a bracket 36 which is mounted on a pivot pin 38 also rotatably mounted to base 14. In this manner the cutting plane of saw blade 18 can be angularly adjusted with respect to the plane in which base 14 lies. The structure thus far described for a circular power saw is well known in the prior art.

Figure 3:
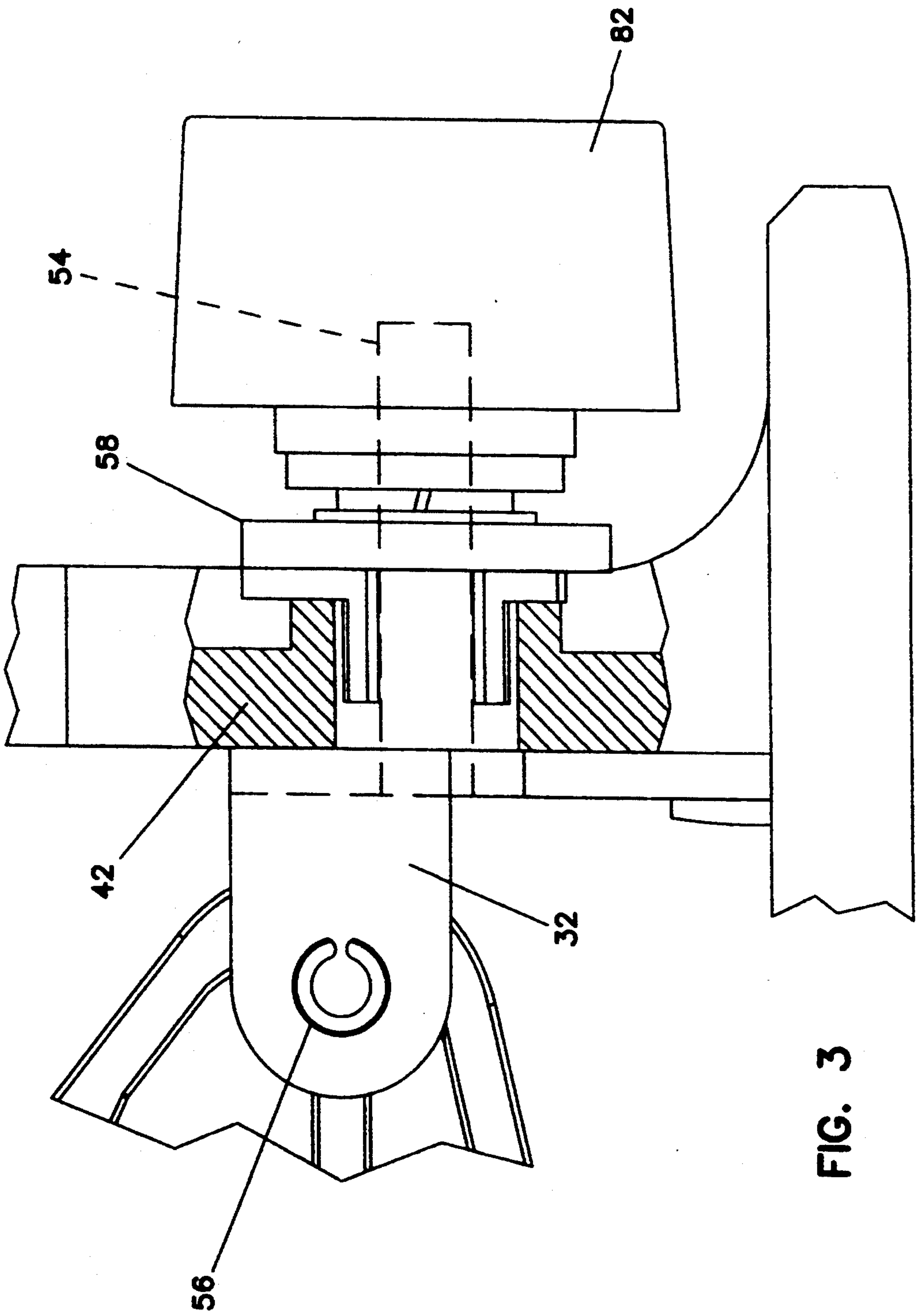
FIG. 3 is a partial sectional view of the variable adjustment means of the present invention.
Figure 4C:
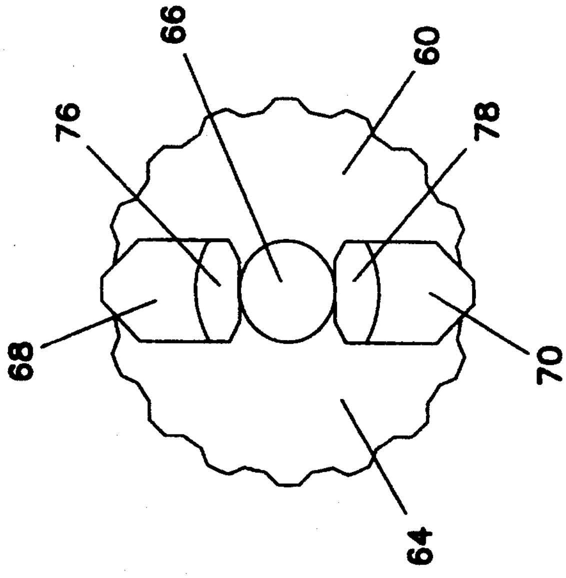
FIGS. 4A–4C are front, side and rear elevational views of an adjustable stop engagement member of the present invention.
Figure 4B:
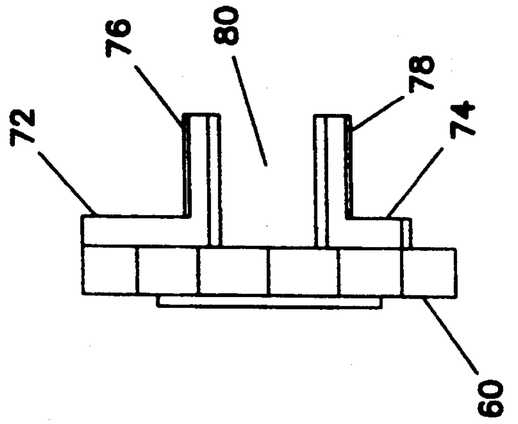
Figure 4A:
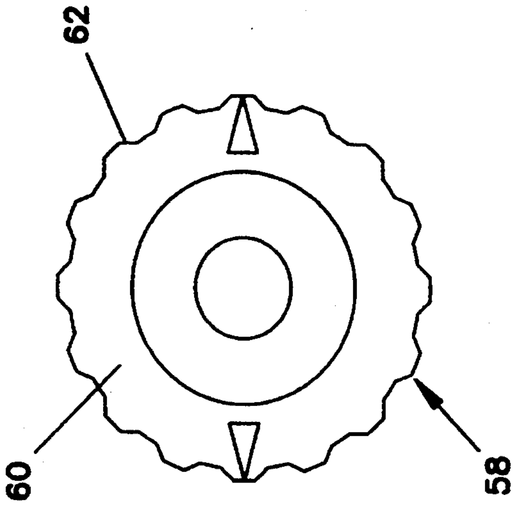

A blade adjustment mechanism is designated generally as 40 and includes an upright base member 42 integrally formed as a part of base 14. Base member 42 has an elongated arcuate opening 44. A first threaded stop member 46 is received within a threaded hole 48 and extends into opening 44 at one end thereof. A second threaded stop member 50 is received within a threaded hole 52 and extends into opening 44 at the other end thereof. A threaded stud 54 is affixed to saw bracket 32 and is received within opening 44. As previously mentioned, saw bracket 32 is attached to saw housing 12 by a spring pin 56. Adjustment mechanism 40 further includes a slotted sleeve member 58 which is shown in more detail in FIGS. 4A–4C. Slotted sleeve member 58 has a disk member 60 with an outer surface 62 and an inner surface 64. Disk member 60 has a central hole 66 and is mounted to threaded stud 54 by inserting stud 54 through hole 66 as shown in FIG. 3. Integrally formed on inner surface 64 are a pair of stop engagement members 68 and 70 having base portions 72 and 74 and leg portions 76 and 78, respectively. Leg portions 76 and 78 are diametrically disposed about hole 66. Leg portions 76 and 78 define a slot at 80 the purpose of which will be described in more detail below. Sleeve member 58 is secured on threaded stud 54 by a control knob 82 which is screwed onto the end of stud 54 and tightened against outer surface 62 of sleeve member 58. In the preferred embodiment a lock washer (not shown) may be disposed between control knob 82 and surface 62.

Figure 5:
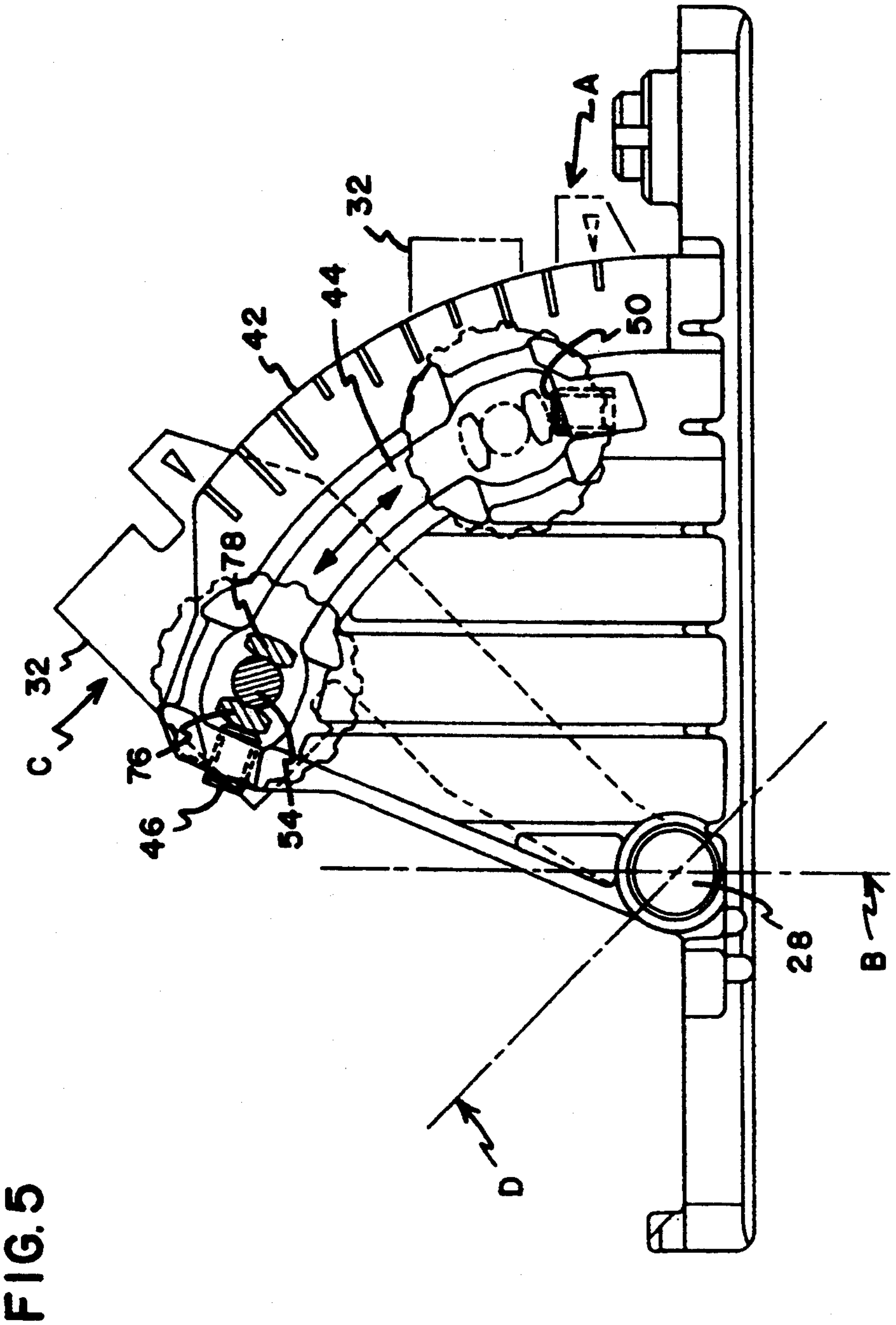
FIG. 5 is a partial front elevational view of the variable adjustment means of the present invention in a first configuration with portions thereof cut away and shown in partial section.

Sleeve member 58 may be mounted on threaded stud 54 in two different configurations. In one configuration which is illustrated in FIG. 5, leg portions 76 and 78 are positioned on stud 54 to engage stop members 46 and 50, respectively, at the outer limits of travel of stud 54 within opening 44. In a second configuration illustrated in FIG. 6, sleeve member 58 is rotated on stud 54 to position slot 80 so that stud 54 itself engages stop members 46 and 48 at the outer limits of rotation. In this second configuration the range of rotation of the power saw on base 14 is increased slightly on each end. In the preferred embodiment the additional range is approximately 3#. Base member 42 is provided with a scale 84 indicating the angular position of saw bracket 32. Bracket 32 has a marker at 86 which cooperates with scale 84 to provide the angular reading. Adjustment mechanism 40 may be periodically calibrated and the angular position accurately maintained through adjustment of stop members 46 and 50 by screwing them in or out as necessary.

In operation, with reference to FIG. 5, with the saw bracket in the position indicated in phantom at A, the cutting plane of circular saw blade 18 is shown at B and is at 90# with respect to the plane of base 14. When saw bracket 32 is in the position shown at C, the cutting plane of the saw blade is indicated at D and is at a 45# angle with respect to the plane of base 14. In this position power saw 10 would create a beveled cut at a 45# angle on the workpiece. As previously mentioned, control knob 82 is tightened on threaded stud 54 to lock bracket 32 in a desired angular position. Other angular beveled cuts can be generated by positioning bracket 32 at angular positions between the limits shown at A and C.

Figure 6:
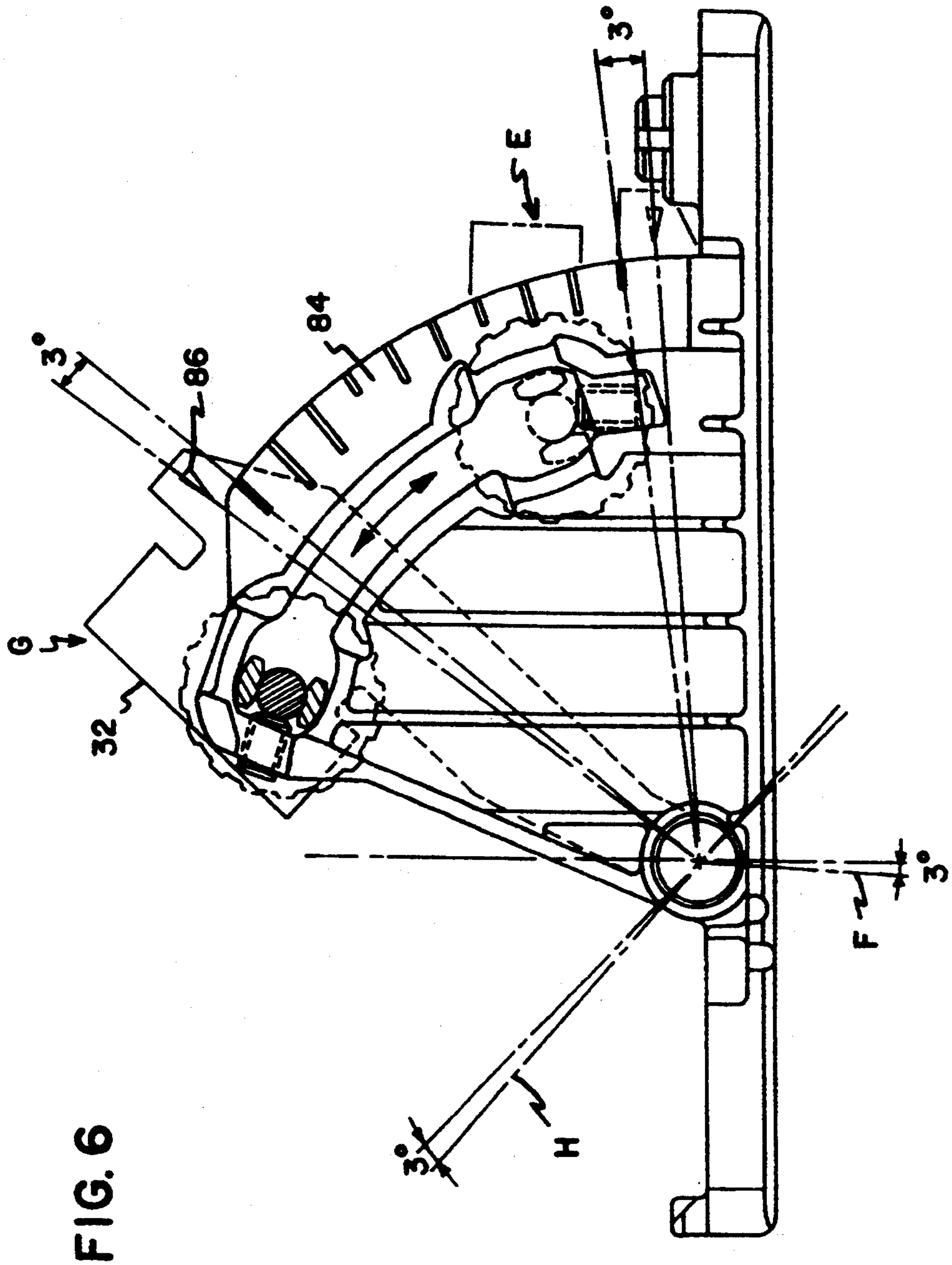
FIG. 6 is a partial front elevational view of the variable adjustment means of the present invention in a second configuration with portions thereof cut away and shown in partial section.

In order to generate a back cut, knob 82 is loosened and sleeve member 58 is rotated on stud 54 to the configuration shown in FIG. 6. With saw bracket 52 in the phantom position shown at E, the cutting plane of blade 18 is shown at F and in the preferred embodiment is approximately 3# beyond the 90# or vertical plane. At the other limit of rotation with bracket 32 in the position shown at G, the cutting plane of blade 18 as shown at H is in the preferred embodiment approximately 3# beyond the 45# plane. In this manner back cuts can be made where desired.

While the preferred embodiment of the invention is disclosed herein, it should be understood that modifications and alternative equivalents are contemplated as within the spirit and scope of the claimed invention.

What is claimed is:

1. A circular power saw comprising:

a housing;

a motor within said housing;

a circular saw blade rotatably driven by said motor;

a base, said housing pivotally mounted to said base whereby said saw blade may be positioned in a plurality of cutting planes;

adjustment means mounted to said base and connected to said housing for releasably retaining said housing in a plurality of positions corresponding to said plurality of cutting planes, said adjustment means further comprising:

an adjustment member with first and second stops corresponding to first and second planar positions of said blade;

a stop engagement member adapted to engage said first and second stops and having a first configuration whereby said first and second positions define the limits of the planar positioning of said blade, said stop engagement member having a second configuration whereby a third planar position different than said first and second planar positions defines a limit of the planar positioning of said blade, said engagement member selectively adjustable between said first and second configurations.

2. A circular power saw in accordance with claim 1 wherein in said second configuration third and fourth planar positions different than said first and second planar positions define the limits of the planar positioning of said blade.

3. A circular power saw in accordance with claim 1 wherein said stop engagement member comprises a first engagement member attached to said housing and a second engagement member selectively mounted on said first engagement member in a first position and a second position whereby in said first position, said second engagement member is positioned to engage said first and second stops and in said second position, said first engagement member is positioned to engage said first and second stops.

4. A circular power saw in accordance with claim 1 wherein said adjustment member further comprises a base member with an elongated arcuate opening therein with said first and second stops positioned at opposite ends of said opening.

5. A circular power saw in accordance with claim 4 wherein said stop engagement member comprises:

a stud affixed to said housing and received within said elongated arcuate opening;

a slotted sleeve member adjustably mounted on said stud in a first position and a second position, said slotted sleeve member positioned to engage said first and second stops in said first position and said stud position to engage said first and second stops with said slotted sleeve member in said second position.

6. A circular power saw comprising:

a housing;

a motor within said housing;

a circular saw blade rotatably driven by said motor;

a base, said housing pivotally mounted to said base whereby said saw blade may be positioned in a plurality of cutting planes, said base having a base member with an elongated arcuate opening therein with first and second stops positioned at opposite ends of said opening;

a stud affixed to said housing and received within said elongated arcuate opening;

a slotted sleeve member selectively mounted on said stud in a first position and a second position, said slotted sleeve member having a stop engagement member adapted to engage said first and second stops when said slotted sleeve member is in said first position, said stud positioned to engage said first and second stops with said slotted sleeve member in said second position; and means for releasably securing said housing to said base with said saw blade in one of said plurality of cutting planes.

* * * * *